US009052585B2

(12) United States Patent
Zhang et al.

(10) Patent No.: US 9,052,585 B2
(45) Date of Patent: Jun. 9, 2015

(54) CONTROL SYSTEM FOR STEREO IMAGING DEVICE

(75) Inventors: Xiaolin Zhang, Tokyo (JP); Zining Zhen, Yokohama (JP)

(73) Assignee: BI2-VISION CO., Kanagawa (JP)

( * ) Notice: Subject to any disclaimer, the term of this patent is extended or adjusted under 35 U.S.C. 154(b) by 326 days.

(21) Appl. No.: 13/528,771

(22) Filed: Jun. 20, 2012

(65) Prior Publication Data

US 2012/0257023 A1 Oct. 11, 2012

Related U.S. Application Data

(60) Provisional application No. 61/511,681, filed on Jul. 26, 2011.

(30) Foreign Application Priority Data

Jul. 14, 2010 (JP) ................................ 2010-159948

(51) Int. Cl.
*H04N 13/02* (2006.01)
*H04N 5/232* (2006.01)
*G03B 35/08* (2006.01)
*G03B 17/56* (2006.01)
*G06T 7/00* (2006.01)

(52) U.S. Cl.
CPC ............ *G03B 35/08* (2013.01); *H04N 13/0239* (2013.01); *H04N 13/0246* (2013.01); *G03B 17/561* (2013.01); *G03B 2206/00* (2013.01); *G06T 7/002* (2013.01)

(58) Field of Classification Search
CPC .. G03B 35/08; G03B 17/561; G03B 2206/00; H04N 13/0239; H04N 13/0246; G06T 7/002
See application file for complete search history.

(56) References Cited

U.S. PATENT DOCUMENTS

| 4,727,471 | A   | * | 2/1988 | Driels et al. ................... 700/66 |
| 7,272,306 | B2  | * | 9/2007 | Zhang et al. .................. 396/325 |
| 7,937,087 | B2  |   | 5/2011 | Goto et al. |
| 2009/0093254 | A1 |   | 4/2009 | Goto et al. |
| 2010/0097444 | A1 | * | 4/2010 | Lablans ......................... 348/46 |

FOREIGN PATENT DOCUMENTS

| AT | 506821 | 5/2011 |
| JP | 2004354257 | 12/2004 |
| JP | 2006-329747 | 12/2006 |
| JP | 2007263669 | 10/2007 |
| JP | 2012-23561 | 2/2012 |

* cited by examiner

*Primary Examiner* — Andy Rao
*Assistant Examiner* — Tyler Edwards
(74) *Attorney, Agent, or Firm* — Wells St. John P.S.

(57) ABSTRACT

To provide a control system of a stereo imaging device that is able to obtain a stereo image, which can be viewed stereoscopically, even when relative-position relationship of a pair of imaging units is unknown. A control system of a stereo imaging device includes a pair of imaging units, an error calculation unit and a control unit. A pair of the imaging units has a digital or analog degree of freedom so as to be able to control at least a yaw, pitch, roll and zoom factor, and can capture video frames using imaging elements. The error calculation unit uses each of images captured by a pair of the imaging units to calculate a rotating error and zoom error of each imaging unit on the basis of a difference from a predetermined standard convergence model of each imaging unit.

7 Claims, 4 Drawing Sheets

CONTROL SYSTEM FOR STEREO IMAGING DEVICE

CROSS REFERENCE TO RELATED APPLICATION

This U.S. patent application relates to and claims priority to corresponding U.S. Provisional Patent Application Ser. No. 61/511,681 which was filed on Jul. 26, 2011, and the entire disclosure is incorporated herein by reference.

TECHNICAL FIELD

The present invention relates to a control system of a stereo imaging device, and more particularly to a control system of a stereo imaging device that can correct a shift in positions of a pair of imaging units of the stereo imaging device.

BACKGROUND ART

A stereo imaging device is used to obtain a stereo image using a pair of cameras, which are placed at left and right sides. In a conventional stereo imaging device, in order to obtain a stereo image, the relative positions and attitudes of a pair of cameras are fixed. Moreover, in order to improve a stereoscopic function, an active-camera stereo imaging device with many degrees of freedom, which can change convergent movements and base-line lengths and can zoom and perform other functions, has been also developed.

If the relative-position relationship of a pair of cameras shifts, a stereo image cannot be produced. Therefore, various methods have been developed to calibrate the above. For example, what is disclosed in Patent Document 1 is designed to store in advance calibration data (calibration parameters) of an imaging device and use the data to calibrate a captured stereo image.

What is disclosed in Patent Document 2 is designed to extract characteristic points from a stereo image from a stereo imaging device and calculate a fundamental matrix (relative geometric information between cameras that make a pair) from the correspondence of the characteristics points to estimate a positional or rotating shift as to the relative positions of the cameras that form a pair.

PRIOR ART DOCUMENTS

Patent Documents

[Patent Document 1] Japanese Patent Application Kokai Publication No. 2004-354257
[Patent Document 2] Japanese Patent Application Kokai Publication No. 2007-263669

DISCLOSURE OF INVENTION

Object of the Invention

However, in both the conventional examples disclosed in Patent Documents 1 and 2, the calibration method used is to measure or set in advance the relative positions of a pair of cameras before calculating differences between the actual positions of the cameras and the measured or set values. Therefore, the amount of computation is enormous, making it difficult to calibrate in real time. Another problem is that the accuracy of calculating the relative positions using the above method is low. Moreover, it is also difficult to make calibration for a shift of a rotating angle around a visual axis of both eyes.

In view of the above circumstances, the object of the present invention is to provide, on the premise that the attitudes and zooming of imaging units can be controlled, a control system of a stereo imaging device that is able to obtain a stereo image, which can be viewed stereoscopically, even when the relative-position relationship of a pair of the imaging units are unknown.

Means for Achieving the Object

To achieve the above object of the present invention, according to one aspect of the present invention, there is provided a control system of a stereo imaging device, the control system characterized by comprising: a pair of imaging units that have a digital or analog degree of freedom so as to be able to control at least a yaw, pitch, roll and zoom factor and can capture video frames using imaging elements; an error calculation unit that calculates a rotating error and a zoom error of each imaging unit on the basis of a difference from a predetermined standard convergence model of each imaging unit by using each of images captured by a pair of the imaging units; and a control unit that controls rotating angles and zoom factors of the imaging units by using the rotating error and the zoom error calculated by the error calculation unit.

In this case, the standard convergence model may satisfy:

1) An inter-axial distance of a pair of the imaging units, an optical axis of each imaging unit, and a u-axis of an imaging element of each imaging unit exist within the same plane;

2) A point where optical axes of the imaging units cross each other is positioned in front of the imaging units; and 3) An object appearing at the center of an imaging element of each imaging unit is zero parallax.

Each imaging unit may be transformed into a pinhole model.

When each imaging unit has the digital degree of freedom, the control unit may control the rotating angles and the zoom factors using image mapping.

When each imaging unit has the analog degree of freedom, the control unit may control the rotating angles and the zoom factors using an actuator that drives each imaging unit.

The error calculation unit may comprise a characteristic point extraction unit, which extracts a characteristic point of each image from each imaging unit, and a characteristic point matching unit, which matches each characteristic point.

The control system of a stereo imaging device may further comprise a convergence angle measurement unit that measures a convergence angle of a pair of the imaging units.

The control unit may perform image mapping, by using the convergence angle measured by the convergence angle measurement unit, in such a way that a flat surface of each image captured by the imaging units becomes parallel.

Advantage of the Invention

The advantage of the control system of the stereo imaging device of the present invention is that, even when the relative-position relationship of a pair of the imaging units is previously unknown, it is possible to obtain a stereo image, which can be viewed stereoscopically.

PREFERRED EMBODIMENTS OF THE INVENTION

Figure 1:
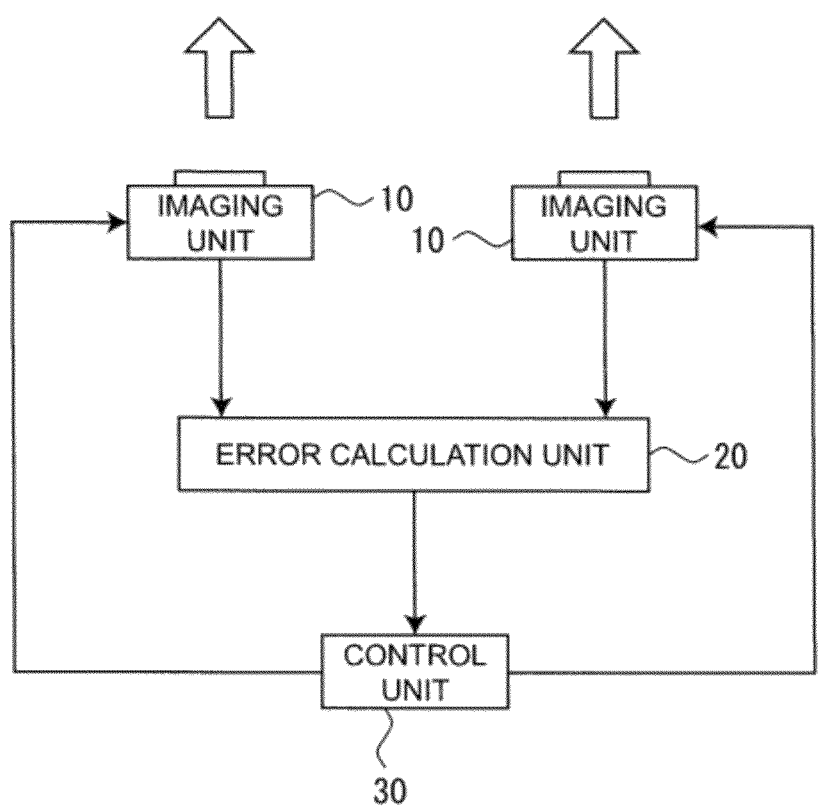
FIG. 1 is a schematic block diagram illustrating a control system of a stereo imaging device of the present invention.

Now, preferred embodiments of the present invention will be described below by referring to the accompanying drawings. FIG. 1 is a schematic block diagram illustrating a control system of a stereo imaging device according to the present invention. As shown in the diagram, the control system of the stereo imaging device of the present invention mainly includes a pair of imaging units 10, an error calculation unit 20, and a control unit 30.

The imaging units 10 have digital or analog degrees of freedom, which make it possible to control at least yaws, pitches, rolls and zoom factors. The imaging units 10 are able to capture video frames using imaging elements. In this case, the digital degrees of freedom mean that, even though the imaging units are fixed, several degrees of freedom are provided by performing rotation, parallel movements, distortion corrections or the likes in image processing for video frames captured. The analog degrees of freedom mean that the imaging units are driven by actuators or the likes so as to have a plurality of degrees of freedom.

The error calculation unit 20 uses each of images captured by a pair of the imaging units 10 to calculate at least a rotating error and a zoom error of each imaging unit from a difference from a predetermined standard convergence model of each imaging unit. In this case, for example, the standard convergence model is defined as follows.

Standard Convergence Model:

1) An inter-axial distance of a pair of the imaging units, an optical axis of each imaging unit, and a u-axis of an imaging element of each imaging unit exist within the same plane.

2) A point where optical axes of imaging units cross each other is positioned in front of the imaging units.

3) An object appearing at the center of an imaging element of each imaging unit is zero parallax.

Moreover, the standard convergence model may also include the following definition.

4) The focal distance of each imaging unit satisfies the following equation:

$$\frac{f_L - f_R}{f_L + f_R} = \tan\theta_c \tan\left(\frac{\theta_v}{2}\right) \qquad \text{[Equation 1]}$$

where $f_L$ is the focal distance of one imaging unit; $f_R$ is the focal distance of the other imaging unit; $\theta_C$ is a conjugated angle of each imaging unit; and $\theta_V$ is a convergence angle of a pair of the imaging units.

Incidentally, because of the condition under which the zoom error is equivalent to zero, the above standard convergence model 4) is unnecessary when the zoom error of a captured image is zero.

As for the standard convergence model, a predetermined positional relationship of cameras can be broadly defined as standard convergence. For example, as for a standard convergence model that can be used for a stereo image which can be viewed stereoscopically, the case in which visual axes of a pair of the imaging units run parallel is also included. Moreover, besides the above standard convergence models 1) to 3), standard convergence models can be defined even when several items are added.

In this case, the reference symbols of parts in the case of FIG. 1 are defined as follows:

Binocular images (Left and right images by the imaging units 10): Left-eye image $I_L$, right-eye image $I_R$ Resolution: Width $r_u$ of image, height $r_v$ of image (Unit: pixels)

Horizontal angle of view: Horizontal angle $\alpha_L$ of view of left-eye image, horizontal angle $\alpha_R$ of view of right-eye image (Unit: degrees)

Five types of error (error calculated by the error calculation unit 20) as follows:

1) Pan drawing error $e_{panD}$: an angle at which a pair of the imaging units should rotate in opposite directions of Pan in such a way that the u-axis of an object appearing at the center of the imaging element of each of a pair of the imaging units 10 does not shift.

2) Tilt drawing error $e_{tiltD}$: an angle at which a pair of the imaging units should rotate in opposite directions of Tilt in such a way that the v-axis of an object appearing at the center of the imaging element of each of a pair of the imaging units 10 does not shift.

3) Roll drawing error $e_{rollD}$: an angle at which a pair of the imaging units should rotate in opposite directions of Roll in such a way that the u-axis line of the imaging element of each of a pair of the imaging units 10 is on the same plane as the inter-axial distance and the optical axis of each imaging unit.

4) Roll conjugated error $e_{rollC}$: an angle at which a pair of the imaging units 10 should rotate in the same direction of Roll in such a way that the u-axis line of the imaging element of each of a pair of the imaging units 10 is on the same plane as the inter-axial distance and the optical axis of each imaging unit.

5) Scale drawing error (Zoom-direction drawing error) $e_{zoomD}$: a logarithm of magnification at which a pair of the imaging units 10 should zoom in or out in such a way that the heights of each of an object appearing at the center of the imaging element of each of a pair of the imaging unit 10 become equal.

(Unit: zoom in log. of magnification; the others in degrees)

Eight positional values (positions that should be controlled by control unit 30) as follows:

1) Left-eye Pan position $X_{panL}$
2) Left-eye Tilt position $x_{tiltL}$
3) Left-eye Roll position $X_{rollL}$ 4) Left-eye Zoom position $x_{zoomL}$
5) Right-eye Pan position $X_{panR}$
6) Right-eye Tilt position $x_{tiltR}$
7) Right-eye Roll position $X_{rollR}$
8) Right-eye Zoom position $X_{zoomR}$
(Unit: zoom in log. of magnification; the others in degrees)

The focal distances $f_L$ and $f_R$ of the imaging units in Equation 1 are different from optical focal distances, and are defined in terms of camera calibration. The focal distances $f_L$ and $f_R$ are coefficients indicating a conversion ratio between an image space and a real space, and are represented as follows:

$$f_L = \frac{r_u/2}{\tan(\alpha_L/2)}, f_R = \frac{r_u/2}{\tan(\alpha_R/2)} \quad \text{[Equation 2]}$$
$$f_0 = \sqrt{f_L f_R}$$

Figure 2:
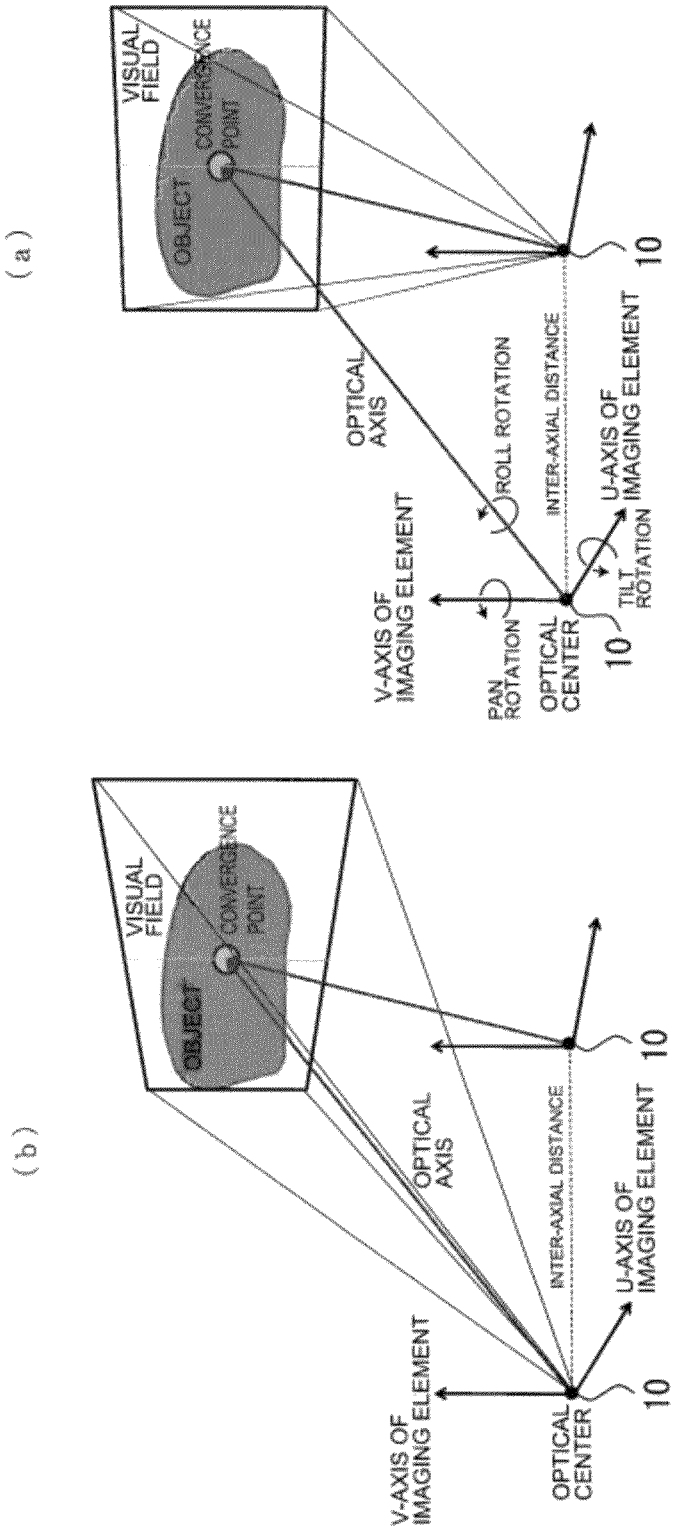
FIG. 2 is a conceptual diagram illustrating a standard convergence model, which is used in the control system of the stereo imaging device of the present invention, using a pinhole model.

FIG. 2 shows a conceptual diagram illustrating a standard convergence model using a pinhole model. FIG. 2(a) shows the state of an image seen from a right-side imaging unit. FIG. 2(b) shows the state of an image seen from a left-side imaging unit. In FIG. 2, the same reference numerals as those in FIG. 1 denote the same parts as those in FIG. 1. Incidentally, as for the imaging units 10, the center of an imaging element is shown as an optical center. The above diagrams are referred to as a pinhole model. As shown in the diagrams, an image viewed from the left side is different from that from the right side. A difference from the above standard convergence model is calculated from the above images by the error calculation unit 20. In the present specification, an error to the standard convergence model is referred to as a standard convergence error. The imaging units or images are corrected so that the standard convergence error comes to zero. In this manner, the imaging units of the control system of the present invention may be turned into a pinhole model.

In this case, the situation where optical axes run parallel in the above standard convergence model is referred to as parallel vision. Moreover, the situation where all conditions of the above standard convergence model are satisfied and where the point at which optical axes of a pair of the imaging units 10 cross each other is on a perpendicular bisector plane of the inter-axial distance is referred to as central convergence.

First, the error calculation unit 20 performs image mapping of two images, which are captured by the left and right imaging units. Suppose that the two images are basically of the same size (Resolution and the number of pixels). Characteristic points, which turn out to be convergence points in the left and right mapping images, are extracted by a characteristic point extraction unit. The characteristic points are each matched by a characteristic point matching unit. That is, the positional coordinates (Two-dimensional vectors) of a corresponding characteristic point in each matching image and the number of those matched are extracted and turned into matching information. Then, from the matching information of the characteristic points, a standard convergence error, which is a difference from the standard convergence model, is calculated. More specifically, for example, the standard convergence error may be a vertical error, a convergence error, a rotating error, a tilt error, or a zoom error. Then, a controlled variable of each degree of freedom is evaluated. More specifically, for example, the controlled variable may be a Pan drawing variable, a Tilt drawing variable, a Roll drawing variable, a Roll conjugation variable, or a Scale drawing variable. A target value of each degree of freedom of image mapping is determined. More specifically, for example, what is determined is each amount of Pan, Tilt, Roll and Scale of the left and right mapping images. As for an amount of correction, all that is required is to gradually correct the images of the two imaging units using a feedback control system. Therefore, the control parameter may be properly set within a range where a control loop converges.

The characteristic point matching unit includes a function for matching each characteristic point extracted to the others using a binocular image ($I_L$, $I_R$). Incidentally, the coordinate system is, for example, a coordinate system whose origin is a top-left apex of an image. According to the control system of the present invention, various matching methods, including a SIFT method and Harris, can be applied. The control system of the present invention is not limited to a specific matching method. With N sets of characteristic points, the matching results are represented as follows:

$$\vec{u_L} = \begin{bmatrix} u_{L1} \\ u_{L2} \\ \vdots \\ u_{LN} \end{bmatrix}, \vec{v_L} = \begin{bmatrix} v_{L1} \\ v_{L2} \\ \vdots \\ v_{LN} \end{bmatrix}, \vec{u_R} = \begin{bmatrix} u_{R1} \\ u_{R2} \\ \vdots \\ u_{RN} \end{bmatrix}, \vec{v_R} = \begin{bmatrix} v_{R1} \\ v_{R2} \\ \vdots \\ v_{RN} \end{bmatrix} \quad \text{[Equation 3]}$$

where $u_{Li}$, $v_{Li}$, $u_{Ri}$ and $v_{Ri}$ represent one set of characteristic points; and ($u_{Li}$, $v_{Li}$) and ($u_{Ri}$, $v_{Ri}$) mean coordinates of characteristic points in a left-eye image and a right-eye image, respectively.

In order to convert the way the sets of left and right characteristic points are expressed into conjugation/drawing, the L/R and C/D conversion described below is performed. Moreover, the coordinate system is transformed into an image-centric coordinate system.

$$\vec{u_C} = \begin{bmatrix} u_{C1} \\ u_{C2} \\ \vdots \\ u_{CN} \end{bmatrix}, \vec{v_L} = \begin{bmatrix} v_{C1} \\ v_{C2} \\ \vdots \\ v_{CN} \end{bmatrix}, \vec{u_D} = \begin{bmatrix} u_{D1} \\ u_{D2} \\ \vdots \\ u_{DN} \end{bmatrix}, \quad \text{[Equation 4]}$$

$$\vec{v_D} = \begin{bmatrix} v_{D1} \\ v_{D2} \\ \vdots \\ v_{DN} \end{bmatrix}$$

$$u_{Ci} = \frac{u_{Li} + u_{Ri}}{2} - \frac{r_u}{2}, v_{Ci} = \frac{v_{Li} + v_{Ri}}{2} - \frac{r_v}{2}$$

$$u_{Di} = \frac{u_{Li} + u_{Ri}}{2}, v_{Di} = \frac{v_{Li} + v_{Ri}}{2}$$

Then, the weight calculation described below is performed for each set of characteristic points.

$$W_{uv} = \begin{bmatrix} w_{uv1} & 0 & \cdots & 0 \\ 0 & w_{uv2} & & \vdots \\ \vdots & & \ddots & 0 \\ 0 & \cdots & 0 & w_{uvN} \end{bmatrix} \quad \text{[Equation 5]}$$

$$W_u = \begin{bmatrix} w_{u1} & 0 & \cdots & 0 \\ 0 & w_{u2} & & \vdots \\ \vdots & & \ddots & 0 \\ 0 & \cdots & 0 & w_{uN} \end{bmatrix},$$

$$W_v = \begin{bmatrix} w_{v1} & 0 & \cdots & 0 \\ 0 & w_{v2} & & \vdots \\ \vdots & & \ddots & 0 \\ 0 & \cdots & 0 & w_{vN} \end{bmatrix}$$

$$w_{uvi} = \max\left(1 - \frac{\sqrt{u_{Ci}^2 + v_{Ci}^2}}{r}, 0\right)$$

$$w_{ui} = \max\left(1 - \frac{|u_{Ci}|}{r}, 0\right), w_{ui} = \max\left(1 - \frac{|v_{Ci}|}{r}, 0\right)$$

Then, for linear regression, the equation of energy of each quantity is defined as follows:

$$\vec{1} = \begin{bmatrix} 1 \\ 1 \\ \vdots \\ 1 \end{bmatrix}, \vec{0} = \begin{bmatrix} 0 \\ 0 \\ \vdots \\ 0 \end{bmatrix}, I = \begin{bmatrix} 1 & 0 & \cdots & 0 \\ 0 & 1 & & \vdots \\ \vdots & & \ddots & 0 \\ 0 & \cdots & 0 & 1 \end{bmatrix}$$ [Equation 6]

$$E_{panD}(k, a) = \left\| W_{uv} \cdot \left( [\vec{0}, \vec{1}] \cdot \begin{bmatrix} k \\ a \end{bmatrix} - \vec{u_D} \right) \right\|$$

$$E_{tiltD}(k, a) = \left\| W_{uv} \cdot \left( [\vec{0}, \vec{1}] \cdot \begin{bmatrix} k \\ a \end{bmatrix} - \vec{v_D} \right) \right\|$$

$$E_{rollD}(k, a) = \left\| W_v \cdot \left( [\vec{u_C}, \vec{1}] \cdot \begin{bmatrix} k \\ a \end{bmatrix} - \vec{v_D} \right) \right\|$$

$$E_{zoomD}(k, a) = \left\| W_u \cdot \left( [\vec{v_C}, \vec{1}] \cdot \begin{bmatrix} k \\ a \end{bmatrix} - \vec{v_D} \right) \right\|$$

$$E_{rollC}(k, a) = \left\| I \cdot \left( [\vec{u_D}, \vec{1}] \cdot \begin{bmatrix} k \\ a \end{bmatrix} - \vec{v_D} \right) \right\|$$

Then, with the use of linear regression, a minimum value of each equation of energy described above is calculated, and an intermediate variable of the error is obtained.

$$a_{panD} = \{a^* | E_{panD}(0, a^*) = \min_a E_{panD}(0, a)\}$$

$$a_{tiltD} = \{a^* | E_{tiltD}(0, a^*) = \min_a E_{tiltD}(0, a)\}$$

$$(k_{rollD}, a_{rollD}) = \{(k_{rollD}^*, a_{rollD}^* | E_{rollD}(k^*, a^*) = \min_{k, a} E_{rollD}(k, a)\}$$

$$(k_{zoomD}, a_{zoomD}) = \{(k_{zoomD}^*, a_{zoomD}^* | E_{zoomD}(k^*, a^*) = \min_{k, a} E_{zoomD}(k, a)\}$$

$$(k_{rollC}, a_{rollC}) = \{(k_{rollC}^*, a_{rollC}^* | E_{rollC}(k^*, a^*) = \min_{k, a} E_{rollC}(k, a)\}$$ [Equation 7]

Using the above, standard convergence errors are calculated as follows:

$$e_{panD} = \tan^{-1}\left(\frac{a_{panD}}{f_0}\right)$$ [Equation 8]

$$e_{tiltD} = \tan^{-1}\left(\frac{a_{tiltD}}{f_0}\right)$$

$$e_{rollD} = \tan^{-1}(k_{rollD})$$

$$e_{zoomD} = \log\left(\sqrt{\frac{1 + k_{zoomD}}{1 - k_{zoomD}}}\right)$$

$$e_{rollC} = \tan^{-1}(k_{rollC})$$

The control unit 30 controls, for example, the rotating angles and the zoom factors of the imaging units 10 by using the standard convergence errors such as the rotating and zoom errors, which are calculated by the error calculation unit 20. The control unit 30 calculates a manipulated variable of each degree of freedom of a pair of the imaging units 10 by using integral calculus, differential calculus, proportion and other calculation methods for the errors. That is, the above is PID control of the imaging units. When a movement of tracking a visual target and other movements, as well as the relative movements of both eyes, are required, then control processes, such as a smooth pursuit movement (tracking of visual targets) that also includes a conjugated movement and a saccade movement (switching of visual lines), may be performed at the same time as the above relative-movement control.

In this case, when a pair of the imaging units 10 has a digital degree of freedom, i.e. when the imaging units 10 are fixed cameras and perform only a process of capturing an image, a Pan, Tilt or Roll process of each of the left and right images, or a control process of Scale is performed in a pseudo manner through image processing (image conversion) in accordance with a target value of the degree of freedom determined as described above. Therefore, it is possible to correct the errors. That is, the rotating and zooming of cameras are virtually realized by image mapping. Moreover, in order to control the rotating angles and the zoom factors, affine transformation may be used. Needless to say, each of a pair of images can be corrected with the use of such a method.

Moreover, when a pair of the imaging units 10 has an analog degree of freedom as in the case of a binocular active camera, a motor system of the binocular active camera may be driven and controlled. That is, in accordance with a target value of the degree of freedom determined as described above, the rotating angles and the zoom factors may be controlled by an actuator that drives each of a pair of the imaging units 10. Specifically, the actuator's Pan, Tilt and Roll may be controlled. Additionally in the case where a system includes a zoom function, zoom factors may be controlled based on a zoom target value. More specifically, as inputs to the imaging units 10, the above eight positional values may be input from the control unit 30, and a zoom mechanism may be controlled with the use of left and right Zoom positional values. Also, rotating mechanisms of Roll, Tilt and Pan may be controlled with the use of other positional values. The actuator may be made so as to have three degrees of freedom with help of three motors. Moreover, controlling the zoom factor also makes it possible to control a horizontal angle of view.

When a pair of the imaging units 10 has an analog degree of freedom, no image mapping is performed. Instead, characteristic matching may be performed with the use of two images captured by the left and right imaging units without altering the two images. Moreover, with the error-calculation result as a direct controlled variable, a target value may be calculated in order to perform a control process in which the error is corrected.

In that manner, in the control system of the present invention, it is unnecessary to use the relative position and the direction of each imaging unit, such as fundamental matrix. Only captured images are required to make calibration. Therefore, the amount of computation is small, and it is possible to make corrections in real time. Thus, calibration is possible even for video frames such as motion pictures.

The convergence angle of a pair of the imaging units 10 may be each measured and used to calculate errors. In the above example, a correction control process is performed with no convergence angle being measured. However, the convergence angle may be measured to correct shifts in the convergence angle. For example, the convergence angle may be measured with the use of image processing or an encoder of a motor of an actuator.

If the convergence angle can be calculated, then it is possible to perform image mapping (affine transformation) using the convergence angle and control in such a way that the flat surfaces of both images run parallel. If it is possible to figure out the convergence angle, further corrections can be made so that the flat surface of an imaging element of an imaging unit, which has been corrected so as to be a standard convergence model, becomes parallel to the inter-axial distance. Therefore, an image can be generated in such a way that the flat surfaces of images of a pair of the imaging units become parallel. The above is an ideal image as an image to be displayed on a three-dimensional display device, for example.

In this case, all angular errors are absolute errors. Therefore, if a plurality of errors occur, it is necessary to perform calculation using an Euler angle to turn the errors into standard convergence at once.

Figure 3:
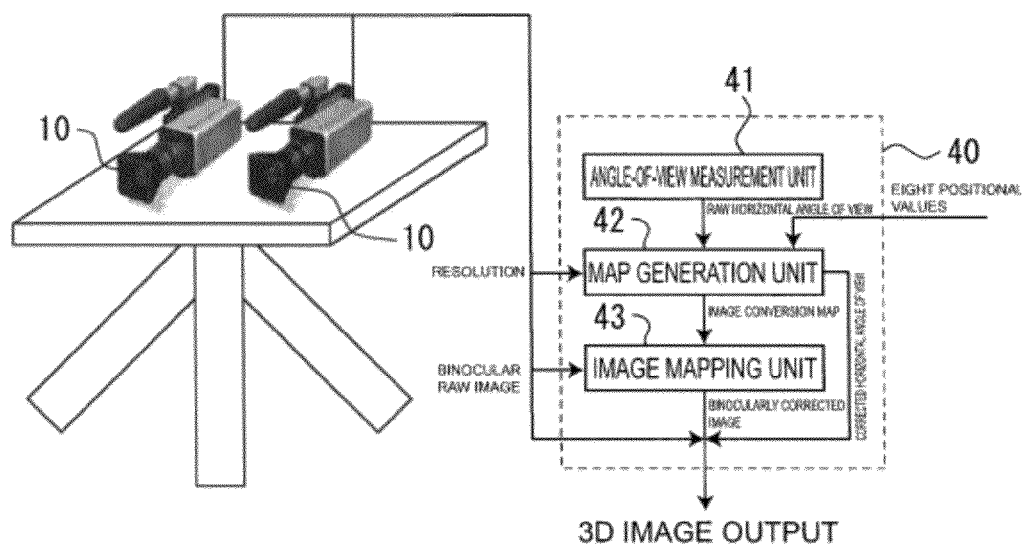
FIG. 3 is a schematic block diagram of the case where the control system of the present invention has been introduced in a stereo imaging device that uses a pair of imaging units the relative positions of which are fixed.

The following describes in a more specific way a stereo imaging system in which the control system of the stereo imaging device of the present invention as described above has been introduced. FIG. 3 is a schematic block diagram of the case where the control system of the present invention has been introduced in a stereo imaging device that uses a pair of the imaging units the relative positions of which are fixed. A pair of the imaging units 10, the relative positions of which are fixed, uses something that has a digital degree of freedom, i.e. image processing of video frames captured, to make corrections to rotation, parallel movements, distortions or the like. Therefore, the imaging units 10 can control yaws, pitches, rolls and zoom factors.

Video frames captured by the imaging units 10 are input into a three-dimensional processing unit 40. The three-dimensional processing unit 40 uses a standard convergence error, which is obtained in advance by image processing, to correct the images input from the imaging units 10 through image mapping (affine transformation). As a result, the images output from the three-dimensional processing unit 40 look as if the visual axes of a pair of the imaging units 10 have been corrected. Therefore, it is possible to output a three-dimensional image with the standard convergence error corrected.

The three-dimensional processing unit 40 includes an angle-of-view measurement unit 41, a map generation unit 42, and an image mapping unit 43. The angle-of-view measurement unit 41 measures an angle of view in advance and generates a raw horizontal angle of view. To the map generation unit 42, the resolution of images is input from the imaging units 10, and the raw horizontal angle of view from the angle-of-view measurement unit 41. The map generation unit 42 generates a corrected horizontal angle of view and an image conversion map by inputting the resolution of the image from the imaging units 10 and the raw horizontal angle from the angle-of-view measurement unit 41, and by using the above eight positional values. The image mapping unit 43 outputs a three-dimensional image to which binocular corrections have been made by inputting raw images of images from the imaging units 10 and the image conversion map from the map generation unit 42.

The reference symbols of parts in the case of FIG. 3 are defined as follows:

Binocular raw images (Left and right raw images by imaging units 10): Left-eye raw image $I_{LO}$, right-eye raw image $I_{RO}$ Raw horizontal angles of view: Horizontal angle $\alpha_{LO}$ of view for left-eye raw image, horizontal angle $\alpha_{RO}$ of view for right-eye raw image (Unit: degrees)

Binocularly corrected images: Left-eye image $I_L$, right-eye image $I_R$

Corrected horizontal angles of view: Horizontal angle $\alpha_L$ of view for left-eye image, horizontal angle $\alpha_R$ of view for right-eye image (Unit: degrees)

Resolution: Width $r_u$ of image, height $r_v$ of image (Unit: pixels)

Image conversion map: u-axis coordinate map $M_{uL}$ for left-eye image, v-axis coordinate map $M_{vL}$ for left-eye image, u-axis coordinate map $M_{uR}$ for right-eye image, v-axis coordinate map $M_{vR}$ for right-eye image.

In this case, the map generation unit 42 generates maps in the following manner. Incidentally, a right-eye map and a left-eye map can be generated from the same equations. Therefore, in the following description, only equations for generation of a left-eye map are shown. First, the following equations are used to calculate a horizontal angle of view.

$$f_{L0} = \frac{r_u/2}{\tan(\alpha_{L0}/2)} \qquad \text{[Equation 9]}$$

$$s = \exp(x_{zoomL})$$

$$f_L = s \cdot f_{L0}$$

$$\alpha_L = 2 \cdot \tan^{-1}\left(\frac{r_u}{2 \cdot f_L}\right)$$

In this case, the maps are defined as follows:

$$M_{uL} = \begin{bmatrix} m_{uL(1,1)} & m_{uL(2,1)} & \cdots & m_{uL(r_u,1)} \\ m_{uL(1,2)} & \ddots & & \vdots \\ \vdots & & \ddots & \vdots \\ m_{uL(1,r_v)} & \cdots & \cdots & m_{uL(r_u,r_v)} \end{bmatrix}, \qquad \text{[Equation 10]}$$

$$M_{vL} = \begin{bmatrix} m_{vL(1,1)} & m_{vL(2,1)} & \cdots & m_{vL(r_u,1)} \\ m_{vL(1,2)} & \ddots & & \vdots \\ \vdots & & \ddots & \vdots \\ m_{vL(1,r_v)} & \cdots & \cdots & m_{vL(r_u,r_v)} \end{bmatrix}$$

Incidentally, the values of the elements of the maps are each represented as follows:

$$\begin{bmatrix} m_{uL}(i,j) \\ m_{vL}(i,j) \end{bmatrix} = f_{L0} \cdot \begin{bmatrix} x_d \\ y_d \end{bmatrix} + \begin{bmatrix} r_u \\ r_v \end{bmatrix} \qquad \text{[Equation 11]}$$

$$\begin{bmatrix} x_d \\ y_d \end{bmatrix} = \begin{bmatrix} \dfrac{\tan(x_{panL}) + x_c}{1 - \tan(x_{panL}) \cdot x_c} \\ \dfrac{y_c}{\cos(x_{panL}) - \sin(x_{panL}) \cdot x_c} \end{bmatrix}$$

-continued $$\begin{bmatrix} x_c \\ y_c \end{bmatrix} = \begin{bmatrix} \frac{x_b}{\cos(x_{tiltL}) - \sin(x_{tiltL}) \cdot y_b} \\ \frac{\tan(x_{tiltL}) + y_b}{1 - \tan(x_{tiltL}) \cdot y_b} \end{bmatrix}$$

$$\begin{bmatrix} x_b \\ y_b \end{bmatrix} = \frac{1}{s} \cdot \begin{bmatrix} \cos(x_{rollL}) & \sin(x_{rollL}) \\ -\sin(x_{rollL}) & \cos(x_{rollL}) \end{bmatrix} \begin{bmatrix} x_a \\ y_a \end{bmatrix}$$

$$\begin{bmatrix} x_a \\ y_a \end{bmatrix} = \frac{1}{f_L} \cdot \begin{bmatrix} i - r_u \\ j - r_v \end{bmatrix}$$

Then, before an image mapping process, a raw image and a corrected image are defined as follows:

$$I_{L0} = \begin{bmatrix} \overrightarrow{z_{L0(1,1)}} & \overrightarrow{z_{L0(2,1)}} & \cdots & \overrightarrow{z_{L0(r_u,1)}} \\ \overrightarrow{z_{L0(1,2)}} & \ddots & & \vdots \\ \vdots & & \ddots & \vdots \\ \overrightarrow{z_{L0(1,r_v)}} & \cdots & \cdots & \overrightarrow{z_{L0(r_u,r_v)}} \end{bmatrix},$$ [Equation 12]

$$I_L = \begin{bmatrix} \overrightarrow{z_{L(1,1)}} & \overrightarrow{z_{L(2,1)}} & \cdots & \overrightarrow{z_{L(r_u,1)}} \\ \overrightarrow{z_{L(1,2)}} & \ddots & & \vdots \\ \vdots & & \ddots & \vdots \\ \overrightarrow{z_{L(1,r_v)}} & \cdots & \cdots & \overrightarrow{z_{L(r_u,r_v)}} \end{bmatrix}$$

where each element is a scalar when the images are monochrome; each element is a vector when the images are color.

Then, image mapping is performed with the use of the following equation:

$$\overrightarrow{z_{L(i,j)}} = \overrightarrow{z_{L0(M_{uL(i,j)}, M_{vL(i,j)})}}$$ [Equation 13]

Incidentally, for a value in coordinates of sub-pixel accuracy, interpolation may be performed with the use of two-dimensional interpolation or the like.

Figure 4:
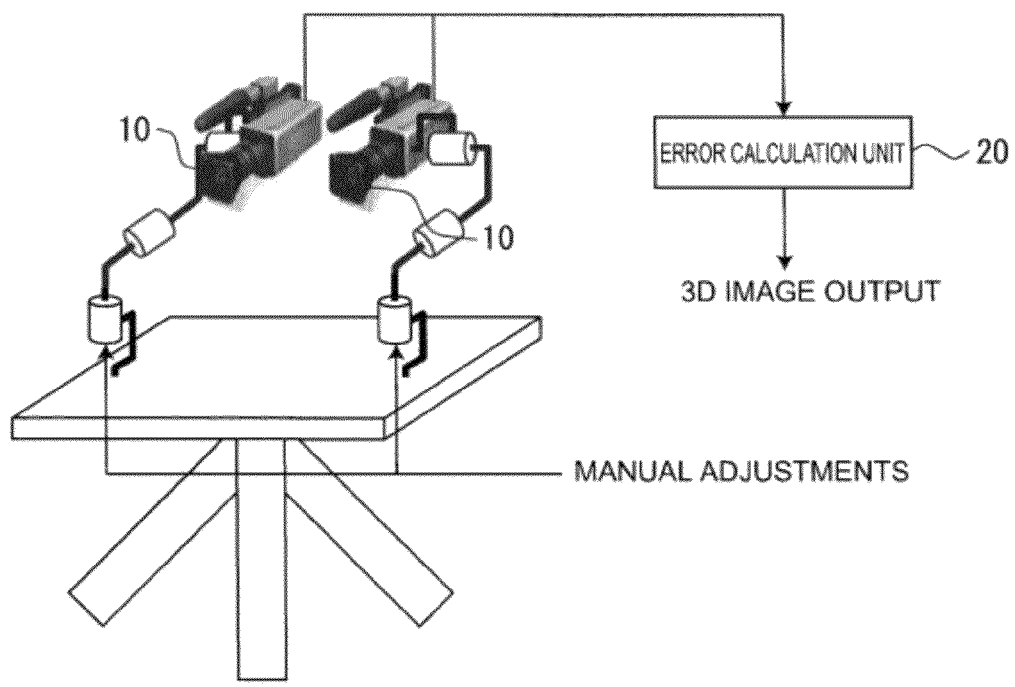
FIG. 4 is a schematic block diagram of the case where the control system of the present invention has been introduced in a stereo imaging device that uses a pair of imaging units having three degrees of freedom.

The following describes the case where the control system of the present invention has been introduced in a stereo imaging device that uses imaging units that have an analog degree of freedom. FIG. 4 is a schematic block diagram of the case where the control system of the present invention has been introduced in a stereo imaging device that uses a pair of the imaging units having three degrees of freedom. A pair of the imaging units 10, which has three degrees of freedom, has an analog degree of freedom. That is, the imaging units are driven by an actuator or the like, and can control yaws, pitches, rolls and zoom factors.

Video frames captured by the imaging units 10 are input into an error calculation unit 20, which then calculates a standard convergence error. The standard convergence error may be calculated by the above Equation 8. With the use of the standard convergence error, the actuator is manually adjusted. An image in which the visual axes of a pair of the imaging units 10 have been corrected is output.

Figure 5:
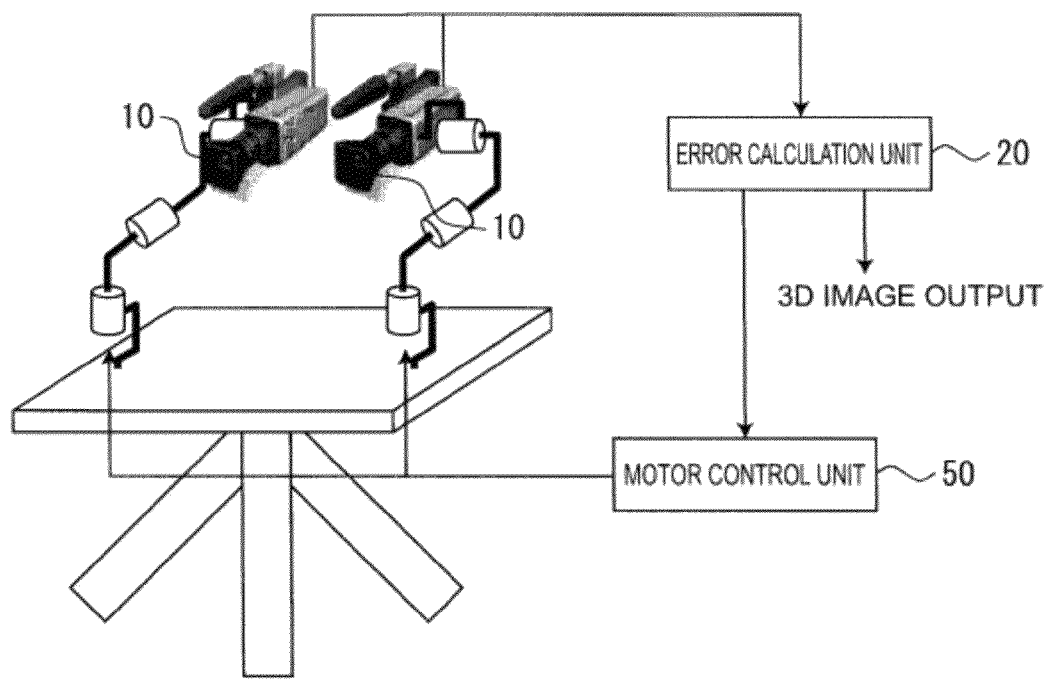
FIG. 5 is a schematic block diagram of another example of the case where the control system of the present invention has been introduced in a stereo imaging device that uses a pair of imaging units having three degrees of freedom.

FIG. 5 is a schematic block diagram of another example of the case where the control system of the present invention has been introduced in a stereo imaging device that uses imaging units having an analog degree of freedom. In this example, a standard convergence error calculated by an error calculation unit 20 is input into a motor control unit 50 in which an eyeball coordination movement control model is situated. The motor control unit 50 controls on the basis of the eyeball coordination movement model, and outputs an image in which the visual axes of a pair of the imaging units 10 have been corrected. Incidentally, as for the eyeball coordination movement, various movement control systems, which include Japanese Patent Application Kokai Publication No. 2006-329747 by the same inventor as one of the present inventors, can be applied.

Figure 6:
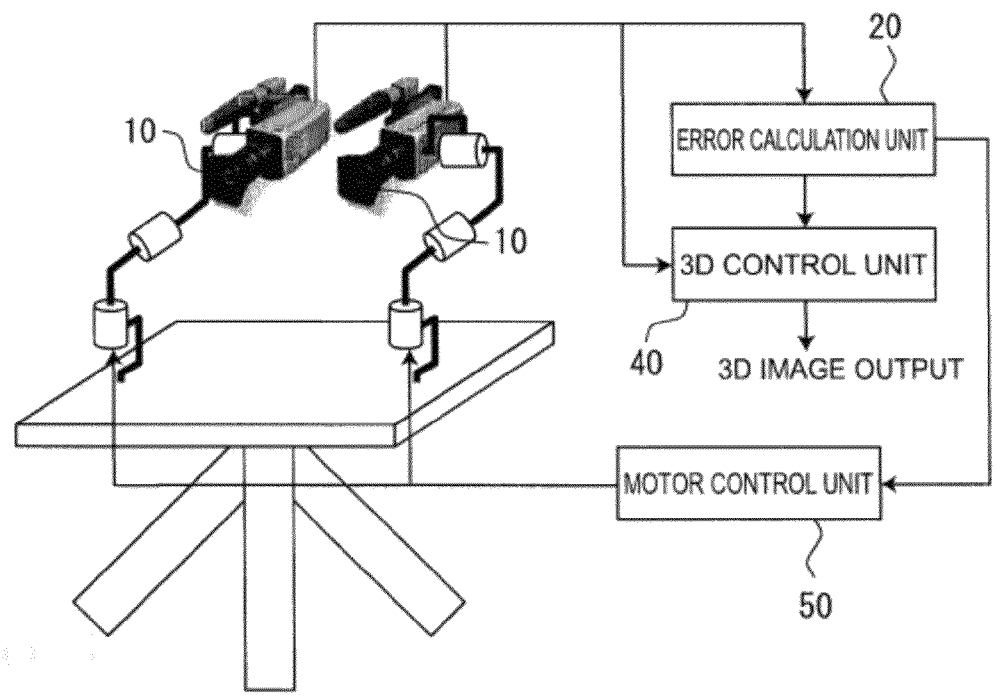
FIG. 6 is a schematic block diagram of still another example of the case where the control system of the present invention has been introduced in a stereo imaging device that uses a pair of imaging units having three degrees of freedom.

FIG. 6 is a schematic block diagram of still another example of the case where the control system of the present invention has been introduced in a stereo imaging device that uses imaging units having an analog degree of freedom. In this example, a standard convergence error calculated by an error calculation unit 20 is used to allow a motor control unit 50 to control on the basis of an eyeball coordination movement model. At the same time, a three-dimensional processing unit 40, which has the same configuration described above, is used to correct the images input from imaging units 10 through image mapping (affine transformation). As a result, the images output from the three-dimensional processing unit 40 look as if the visual axes of a pair of the imaging units 10 have been corrected. Because of such a configuration, it is possible to correct the standard convergence error using an analog degree of freedom, as well as to correct the standard convergence error using a digital degree of freedom.

The control system of the stereo imaging device of the present invention is not limited to the above illustrated embodiments, but various modifications may be made without departing from the scope of the present invention.

EXPLANATION OF REFERENCE SYMBOLS

10: Imaging unit
20: Error calculation unit
30: Control unit
40: Three-dimensional processing unit
50: Motor control unit

What is claimed is:

1. A control system of a stereo imaging device, the control system comprising:
    a pair of imaging units that have a digital or analog degree of freedom so as to be able to control at least a yaw, pitch, roll and zoom factor and can capture video frames using imaging elements;
    an error calculation unit that includes a characteristic point extraction unit, which extracts a characteristic point of each image from each imaging unit, and a characteristic point matching unit, which matches each characteristic point, and that calculates a roll conjugated error, a rotating error and a zoom error of each imaging unit on the basis of a difference from a predetermined standard convergence model defined by a positional relationship of each imaging unit by using the characteristic point of each of images captured by a pair of the imaging units;
    a control unit that controls roll conjugated angles in a roll direction of each imaging unit by using the roll conjugated error calculated by the error calculation unit, and that controls rotating angles and zoom factors of the imaging units by using the rotating error and the zoom error calculated by the error calculation unit; and
    wherein the pair of the imaging units are capable of rotating in such a way that the u-axis line of the imaging element of each of the pair of the imaging units is on the same plane as the inter-axial distance and the optical axis of each of the pair of the imaging units.

2. The control system of the stereo imaging device according to claim 1, in which
the standard convergence model satisfies:
1) an inter-axial distance of a pair of the imaging units, an optical axis of each imaging unit, and a u-axis of an imaging element of each imaging unit exist within the same plane;
2) a point where optical axes of the imaging units cross each other is positioned in front of the imaging units; and
3) an object appearing at the center of an imaging element of each imaging unit is zero parallax.

3. The control system of the stereo imaging device according to claim 1, in which each imaging unit is transformed into a pinhole model.

4. The control system of the stereo imaging device according to claim 1, in which when each imaging unit has a digital degree of freedom, the control unit controls the rotating angles and the zoom factors using image mapping.

5. The control system of the stereo imaging device according to claim 1, in which when each imaging unit has an analog degree of freedom, the control unit controls the rotating angles and the zoom factors using an actuator that drives each imaging unit.

6. The control system of the stereo imaging device according to claim 1, which further comprises a convergence angle measurement unit that measures a convergence angle of a pair of the imaging units.

7. The control system of the stereo imaging device according to claim 6, in which the control unit uses the convergence angle measured by the convergence angle measurement unit to perform image mapping in such a way that a flat surface of each image captured by the imaging units becomes parallel.

* * * * *

UNITED STATES PATENT AND TRADEMARK OFFICE
CERTIFICATE OF CORRECTION

PATENT NO.       : 9,052,585 B2
APPLICATION NO.  : 13/528771
DATED            : June 9, 2015
INVENTOR(S)      : Xiaolin Zhang et al.

Page 1 of 1

It is certified that error appears in the above-identified patent and that said Letters Patent is hereby corrected as shown below:

In the Specification

Column 7, line 49 – In Equation 7, replace

" $(k_{rollD}, a_{rollD}) = \{(k_{rollD}*, a_{rollD}* | E_{rollD}(k*, a*) = min_{k,a} E_{rollD}(k, a)\}$ "

with -- $(k_{rollD}, a_{rollD}) = \{(k^*_{rollD}, a^*_{rollD} | E_{rollD}(k^*, a^*) = min_{k,a} E_{rollD}(k, a)\}$ --

Column 7, line 52 – In Equation 7, replace

" $(k_{zoomD}, a_{zoomD}) = \{(k_{zoomD}*, a_{zoomD}* | E_{zoomD}(k*, a*) = min_{k,a} E_{zoomD}(k, a)\}$ "

with -- $(k_{zoomD}, a_{zoomD}) = \{(k^*_{zoomD}, a^*_{zoomD} | E_{zoomD}(k^*, a^*) = min_{k,a} E_{zoomD}(k, a)\}$ --

Column 7, line 55 – In Equation 7, replace

" $(k_{rollC}, a_{rollC}) = \{(k_{rollC}*, a_{rollC}* | E_{rollC}(k*, a*) = min_{k,a} E_{rollC}(k, a)\}$ "

with -- $(k_{rollC}, a_{rollC}) = \{(k^*_{rollC}, a^*_{rollC} | E_{rollC}(k^*, a^*) = min_{k,a} E_{rollC}(k, a)\}$ --

Signed and Sealed this
First Day of March, 2016

Michelle K. Lee
*Director of the United States Patent and Trademark Office*